July 1, 1941.   J. L. HIPPLE   2,247,685
WHEEL ASSEMBLY
Filed Dec. 1, 1938
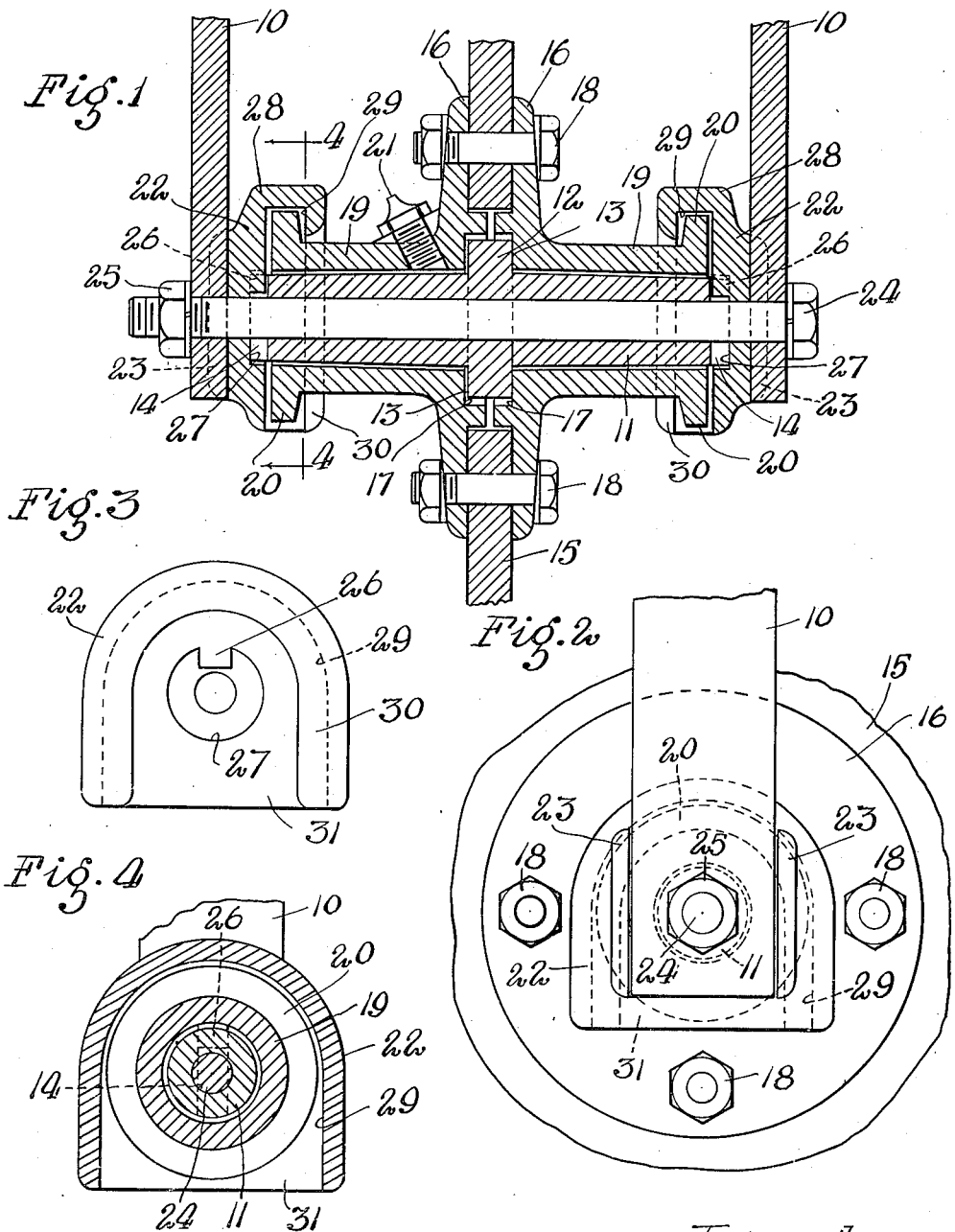
Inventor
James L. Hipple
By V. F. Lasagne
Atty.

Patented July 1, 1941

2,247,685

UNITED STATES PATENT OFFICE 2,247,685

WHEEL ASSEMBLY

James L. Hipple, Canton, Ill., assignor to International Harvester Company, a corporation of New Jersey Application December 1, 1938, Serial No. 243,465

8 Claims. (Cl. 308—19)

This invention relates to a wheel assembly and more particularly to a bearing and hub construction therefor. The construction provided by the invention is particularly adapted for use in rotatable elements such as gauge wheels and colters employed in agricultural implements.

In the construction of wheels in general, it is desirable to provide a hub and bearing assembly which may be readily assembled and installed in position in the vehicle or implement in which it is to be utilized. It is desirable to provide a mounting shaft as a component part of the hub assembly and to provide means associated with the shaft and hub for maintaining certain relative positions of parts thereof and for use in installing the wheel, as aforesaid. Such provisions are particularly important when a hub assembly for a gauge wheel or the like, for use in agricultural implements is to be utilized. As is well known to those skilled in the art, the bearing parts of implement wheels are subject to extreme wear and breakage because of the adverse conditions under which the implements are operated. Such breakage and wear is due primarily to faulty lubrication and the entrance of dirt and other foreign particles, because the implements are often operated in loose and sandy soil which is substantially constantly thrown upon the hub and bearing assemblies of the wheels. In gauge wheel and colter constructions, because of slow speed operation, the lubricant does not become so quickly thinned. But it often happens that the viscous lubricant accumulates fine dust particles, and this dust-laden lubricant is forced back into the assembly, thus causing premature wear of the parts. It is desirable to provide a construction in which the parts cooperate to retain the viscous lubricant but permit escape of excess dirt and undesirable accumulations of dirt and lubricant. It is also desirable to provide a construction that is simple and inexpensive to manufacture, eliminating addition to the cost of the entire implement occasioned by the provision of expensive bearing assemblies.

The principal object of the present invention is to provide an improved hub and bearing assembly incorporating features of construction permitting the assembly to be readily dismantled for repair or replacement of worn and broken parts.

An important object is to provide component parts of the assembly in such a manner that they cooperate in forming a more effective seal against the escape of lubricant and against the entrance of larger dust and other foreign particles, thus eliminating complicated and expensive seals such as are specially provided in more expensive structures.

Another important object is to provide certain parts with openings therein to permit the escape of dirt and other foreign particles that may find their way into the assembly.

Another object is to provide an assembly which may be rigidly and securely held in a supporting structure without binding relatively rotatable parts.

And another object is to provide the assembly in a manner permitting easy installation in and removal from the supporting structure as a unit.

Briefly and specifically, these and other important objects are achieved by the provision of a transverse shaft having a central thrust flange formed thereon, which shaft is securely held against rotation at its opposite ends by a pair of collars which are in turn held against rotation in a supporting structure comprising a pair of spaced members or supports. A wheel is rotatably carried on the shaft and includes a pair of hub portions bearing against opposite sides of the thrust flange, each hub extending axially along the shaft toward a respective collar whereat the hub is provided with an annular flange which cooperates with a U-shaped groove or recess in the collar to provide a more effective seal against the entrance of dirt, the open side of the U permitting escape of finer dirt and other foreign particles that may find their way into the assembly. Each collar is provided with means slidably coacting with the supports for permitting removal of the assembly as a unit from the supports. A tie bolt or arbor is passed centrally through the shaft, supports and collars for securing the shaft and collars rigidly in place in the supports without affecting the bearing relation between the shaft and wheel.

A more complete understanding of the objects and desirable features of the invention may be had from the following detailed description taken in conjunction with the accompanying sheet of drawings, in which:

Figure 1 is a vertical sectional view of the improved hub and bearing assembly showing the manner of mounting thereof in a pair of supports;

Figure 2 is a side elevational view of the same;

Figure 3 is a detail view of one of the collars or mounting members, as viewed from inside the assembly; and, Figure 4 is a vertical sectional view taken substantially along the line 4—4 of Figure 1.

The particular construction chosen for the purposes of illustration includes a pair of spaced members or supports 10 which may be suitably secured to a vehicle or implement, not shown, to which the construction may be readily adapted. The construction is particularly well adapted for use in agricultural implements, such as plows or the like, as gauge wheel or rolling colter assemblies. A shaft 11 is disposed transversely between the supports and is formed with a central annular thrust flange 12 provided with opposite, radially disposed, hardened bearing surfaces 13. Opposite ends of the shaft are formed with radial notches 14 to provide means for mounting the shaft in a manner that will hereinafter appear. A wheel 15 is rotatably carried on the shaft 11 and includes a pair of opposite hub portions 16, each of which is provided with an inner radial bearing face 17 bearing against the bearing faces 13 on the thrust flange 12. The hubs 16 are assembled on the shaft 11 at opposite sides of the thrust flange and are secured to the wheel 15 by a plurality of bolts 18. Each hub is formed with an integral sleeve 19 extending axially outwardly from the thrust flange 12 and terminates at its end in an annular flange 20. A lubricant fitting 21 is carried by one of the hubs 16 for lubricating the bearing surfaces provided between the faces 13 and 17 of the thrust flange and hubs, respectively, and the bearing surfaces formed between the diameter of the shaft and the central bores in the hubs.

In order to mount the wheel assembly between the supports 10, means has been provided in the form of a pair of mounting members or collars 22, which collars, as best shown in Figure 2, have portions 23 thereon engaging the sides of a respective support 10. The collar 22 fits against the inner face of a support 10 and the portions 23 provide means whereby the collar is slidably mounted with respect to the support 10. A transverse tie bolt or arbor 24 is passed through the supports, collars and shaft and is provided at its opposite end with a nut 25 for rigidly securing the assembly together, the parts being suitably provided with bores for receiving the bolt. The nut 25 may be securely tightened on the bolt 24 without interfering with the bearing relation between the shaft 11 and the hubs 16.

Each collar 22, through the medium of the portions 23, is held against angular movement with respect to the support. Each collar is further provided with a portion 26 which engages the notch 14 in the proximate end of the shaft 11, thus providing against rotation of the shaft 11 with respect to the collars. This portion 26 provides part of a means including a recess 27 formed in the collar for receiving the proximate end of the shaft for mounting the same in position between the supports 10.

Each collar includes an inwardly extending enlarged portion 28 which is formed with an inner substantially annular or U-shaped recess or groove 29. As best shown in Figure 1, this groove 29 fits over and cooperates with the annular flange 20 on the proximate end of a hub 16. This portion further includes an integral, radially inwardly extending U-shaped flange 30 which substantially surrounds the sleeve portion 19 of the respective hub 16, the radial inner face of the flange overlying and being disposed axially inwardly of the respective hub flange 20. The particular shape of the collars 22 and the provision of the grooves 29 therein form parts which cooperate with the hub sleeves and end flanges thereon in serving to prevent the ready escape of viscous lubricant from the hub assembly. The open side of the U-shaped groove 29 is disposed downwardly, as at 31, and provides for the escape from the assembly of dirt-laden lubricant.

When the wheel is to be mounted between the supports 10, the hub portions 16 are disposed at opposite sides of the thrust flange 12 on the shaft 11 and are secured in position thereat and to the wheel 15 by the bolts 18. The collars 22 are mounted at the opposite ends of the shaft and hubs, this being permitted by the provision of the open side 31 of the collar. The projecting portions 26 in the collars 22 engage the notches 14 in the ends of the shaft and the shaft and collars are moved angularly until the portions 23 on the collars are alined with opposite edges of the supports 10. The assembly is then slid into place, lengthwise of the supports, and securely held therebetween by the bolt 24 and the nut 25. As previously mentioned, the cooperation between the collars 22 and the flanges 20 on the hubs 16 provides a more effective seal against the entrance of larger particles of dirt and the like, and the openings 31 at the underside of the collars permit the escape of finer dirt particles and dirt-laden lubricant from the assembly during rotation of the wheel. The openings serve to permit old lubricant to be readily forced out when new lubricant is supplied through the fitting.

From the foregoing description, it will be seen that an improved bearing construction has been provided containing the important features hereinbefore described. It will be apparent that numerous alterations and modifications may be made in the particular construction shown without departing from the spirit and scope of the invention as defined in the appended claims.

What is claimed is:

1. In a wheel construction, the combination with a pair of spaced supports, of a shaft disposed transversely therebetween and formed with a central thrust flange, a wheel rotatably carried by the shaft and having hubs disposed at opposite sides of the thrust flange, a pair of collars slidably associated respectively with the supports and slidably removable therefrom in a direction generally radially of the shaft, each having a recess therein for supporting the proximate end of the shaft, each collar further having a portion formed with a second recess surrounding the proximate end of the respective hub, means between the shaft and the collar for holding said parts against relative rotation, and means between the collars and the supports normally holding the collars against sliding movement with respect to the supports.

2. In a wheel construction, the combination with a pair of spaced supports, of a shaft disposed transversely therebetween and including a centrally disposed thrust flange, a wheel rotatably carried by the shaft and including a pair of opposite hub portions bearing against the thrust flange, each hub having a sleeve portion surrounding the shaft and extending axially outwardly from the thrust flange, and a pair of collars carried respectively by the supports, each collar being formed with a central recess fitting the proximate end of the shaft, and means on each collar cooperating with the proximate end portion of each shaft to provide against relative angular movement thereof, each collar being further formed with a U-shaped recess therein substantially surrounding the proximate end of a respective hub sleeve.

3. In a wheel construction, the combination with a pair of spaced supports, of a shaft disposed transversely therebetween and including a centrally disposed thrust flange, a wheel rotatably carried by the shaft and including a pair of opposite hub portions bearing against the thrust flange, each hub having a sleeve portion surrounding the shaft and extending axially outwardly from the thrust flange to the respective support, each sleeve terminating in an annular flange, and a pair of collars carried respectively by the supports, each collar being formed with a central recess fitting the proximate end of the shaft, means on each collar cooperating with the proximate end portion of the shaft to provide against relative angular movement thereof, each collar being further formed with a U-shaped recess therein substantially surrounding the end flange of a respective hub sleeve, each collar further including a U-shaped radial flange portion partially closing the U-shaped recess and lying axially inwardly of the flange on the proximate hub sleeve.

4. In a wheel construction, the combination with a pair of spaced, substantially vertical supports, a horizontal shaft disposed transversely between the supports, a collar slidably associated with each support and having a portion thereon coacting with the support to provide against relative angular movement therebetween, each collar having a recess therein for mounting the proximate end of the shaft, each collar being further formed with a U-shaped groove therein concentric with the shaft axis and disposed in a vertical plane, the open portion of the groove being at the bottom of the collar, a wheel rotatably carried on the shaft and including opposite, axially extending hub sleeves, each sleeve terminating in a radial flange substantially fitting the groove in the respective collar, and a tie bolt extending through the shaft, collars and supports.

5. In a wheel construction, the combination with a support having a substantially flat inner face, of a transverse shaft extending axially from said inner face and spaced axially therefrom, a wheel rotatably carried by the shaft and including a hub portion extending axially toward the inner face of the support, and a member disposed at the inner face of and removably carried by the support for mounting the shaft, said member having a portion thereon coacting with the support to provide against relative angular displacement thereof and being slidably removable from the support in a direction radially of the shaft axis, said member further including a portion engaging the shaft to provide against relative angular movement thereof, said member being formed with a peripheral portion substantially embracing the hub portion to provide a dirt seal about the hub, said portion being open at its bottom portion to permit escape of foreign particles.

6. In a wheel construction, the combination with a pair of spaced supports, of a shaft disposed transversely therebetween and formed with a central thrust flange, a mounting member disposed respectively between each support and each end of the shaft for mounting the shaft, each member including a portion having a U-shaped groove formed about the shaft axis as a center and open at one side, a tie bolt passed through the supports, members and the shaft for rigidly securing said parts together, and a wheel rotatably carried by the shaft and including opposite hub portions bearing against the thrust flange, each hub portion extending axially outwardly to the respective mounting member and being provided with a flange coacting with the arcuate portion of the U-shaped groove in the mounting member to form a dirt seal, the open side of the U serving to allow escape of dirt.

7. In a wheel construction, the combination with a pair of spaced supports, of a shaft disposed transversely therebetween, a mounting member disposed respectively between each support and each end of the shaft for mounting the shaft, each member including a portion having a substantially annular recess formed about the shaft axis as a center, a tie bolt passed through the supports, members and the shaft for rigidly securing said parts together, and a wheel rotatably carried by the shaft and including opposite hub portions, each hub portion extending axially outwardly to the respective mounting member and having an annular flange thereon coacting with the annular recess therein to form a dirt seal.

8. In a wheel construction, the combination with a support having a substantially flat inner face, of a transverse shaft extending in an axial direction from said inner face and spaced axially therefrom, a wheel rotatably carried by the shaft and including a hub portion extending axially toward the inner face of the support, and a member disposed at the inner face of and removably carried by the support for mounting the shaft, said member having a portion thereon coacting with the support to provide against relative angular displacement thereof and being slidably removable from the support in a direction radially of the shaft axis, said member further including a portion thereon coacting with the shaft to provide against relative angular movement thereof, said member being formed with a substantially annular portion substantially embracing the hub portion to provide a dirt seal about the hub.

JAMES L. HIPPLE.

CERTIFICATE OF CORRECTION.

Patent No. 2,247,685. July 1, 1941.

JAMES L. HIPPLE.

It is hereby certified that error appears in the printed specification of the above numbered patent requiring correction as follows: Page 3, first column, line 59, claim 5, for the word "engaging" read --thereon coacting with--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.